(12) United States Patent
Fox et al.

(10) Patent No.: US 12,050,942 B2
(45) Date of Patent: Jul. 30, 2024

(54) PROVIDING VISUAL DASHBOARDS FOR API-BASED PRODUCTS

(71) Applicant: MASTERCARD TECHNOLOGIES CANADA ULC, Vancouver (CA)

(72) Inventors: Justine Celeste Fox, Pitt Meadows (CA); Marc Grimson, Ithaca, NY (US); Christopher Waddell, Vancouver (CA); Chelsea Urquhart, Vancouver (CA); Leena Ruhela, Port Coquitlam (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 17/831,612

(22) Filed: Jun. 3, 2022

(65) Prior Publication Data
US 2022/0391271 A1   Dec. 8, 2022

Related U.S. Application Data

(60) Provisional application No. 63/196,776, filed on Jun. 4, 2021.

(51) Int. Cl.
*G06F 9/54* (2006.01)
*G06F 9/451* (2018.01)

(52) U.S. Cl.
CPC .............. *G06F 9/543* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2004/0113934 A1 | 6/2004 | Kleinman et al. | |
| 2004/0183824 A1 | 9/2004 | Benson et al. | |
| 2006/0053411 A1* | 3/2006 | Takamiya | G06F 40/143 |
| | | | 717/115 |
| 2013/0198637 A1* | 8/2013 | Childers, Jr. | H04L 41/08 |
| | | | 715/735 |
| 2018/0249309 A1* | 8/2018 | Nakano | H04Q 9/00 |
| 2020/0364044 A1 | 11/2020 | Bahrami et al. | |

OTHER PUBLICATIONS

International Search Report and Written Opinion for Related Application No. PCT/CA2022/050887 dated Sep. 20, 2022 (8 pages).

* cited by examiner

*Primary Examiner* — Syed A Roni
(74) *Attorney, Agent, or Firm* — Michael Best & Friedrich LLP

(57) ABSTRACT

Methods and systems for providing visual dashboards for cloud-based products. One system includes an electronic processor configured to receive a request for a visual dashboard. The electronic processor is also configured to execute a first application programming interface (API) call to a first API-based product to access a first configuration file associated with the first API-based product. The electronic processor is also configured to receive a first API response from the first API-based product. The electronic processor is also configured to generate and output, based on the first configuration file, the visual dashboard, the visual dashboard providing information associated with the first API-based product.

19 Claims, 13 Drawing Sheets

PROVIDING VISUAL DASHBOARDS FOR API-BASED PRODUCTS

CROSS-REFERENCE TO RELATED APPLICATIONS

This application claims priority to U.S. Provisional Patent Application No. 63/196,776 filed Jun. 4, 2021, the entire contents of which is incorporated by reference herein.

FIELD

Embodiments described herein relate methods and systems for providing visual dashboards for API-based products.

BACKGROUND

Many application programming interface ("API") based products lack a visual walkthrough component or dashboard that enable customers to better understand the benefits of the solution or product without an abundance of reliance on written material, such as product presentations and whitepapers.

SUMMARY

Accordingly, the embodiments described herein provide methods and systems for providing visual dashboards for API-based products. Embodiments described herein provide for a standardized visual dashboard where a customer or account holder is provided with information relating to API-based products. Such information may include, for example, a listing of registered API-based products that the account holder is registered with, a listing of available API-based products that are available to the account holder for registration, information relating to individual API-based products, a performance metric of one or more API-based products, and the like. Accordingly, embodiments described herein enable a user to navigate through a series of graphical user interfaces (as a visual dashboard) to interact with various API-based products (registered and unregistered), access information relating to various API-based products (for example, information enabling the user to better understand the benefits of API-based products), and the like.

Additionally, embodiments provide a customer on-boarding experience for API-based products or solutions that is greatly simplified in comparison to previous solutions. Additionally, the embodiments provide a clearer customer value proposition than previous solutions (for example, via one or more visual indicators of the value proposition of the API-based product). Furthermore, embodiments described herein may be implemented with little or no development effort for API-based products that provide OpenAPI specifications. Therefore, the embodiments described herein enable a small development team to launch and manage multiple API-based products with low development overhead.

One embodiment provides a system for providing visual dashboards for API-based products. The system includes an electronic processor configured to receive a request for a visual dashboard. The electronic processor is also configured to execute a first API call to a first API-based product to access a first configuration file associated with the first API-based product. The electronic processor is also configured to receive a first API response from the first API-based product. The electronic processor is also configured to generate and output, based on the first configuration file associated with the first API-based product, the visual dashboard and the visual dashboard providing information associated with the first API-based product.

Another embodiment provides a method for providing visual dashboards for API-based products. The method includes receiving a request for a visual dashboard. The method also includes executing, with an electronic processor, a set of API calls to a first API-based product to access a first configuration file associated with the first API-based product. The method also includes receiving, with the electronic processor, a first API response from the first API-based product. The method also includes generating and outputting, with the electronic processor, the visual dashboard based on the first configuration file associated with the first API-based product and the visual dashboard providing information associated with the first API-based product.

Yet another embodiment provides a non-transitory, computer-readable medium storing instructions that, when executed by an electronic processor, perform a set of functions. The set of functions includes receiving a request for a visual dashboard. The set of functions also includes executing a set of API calls to a first API-based product to access the first configuration file associated with the first API-based product. The set of functions also includes receiving a first API response from the first API-based product. The set of functions also includes generating and outputting the visual dashboard based on the first configuration file associated with the first API-based product, the visual dashboard providing at least a performance metric associated with the first API-based product. The set of functions also includes detecting a user interaction with the visual dashboard. The set of functions also includes generating and outputting an updated visual dashboard based on the user interaction.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Figure 1:
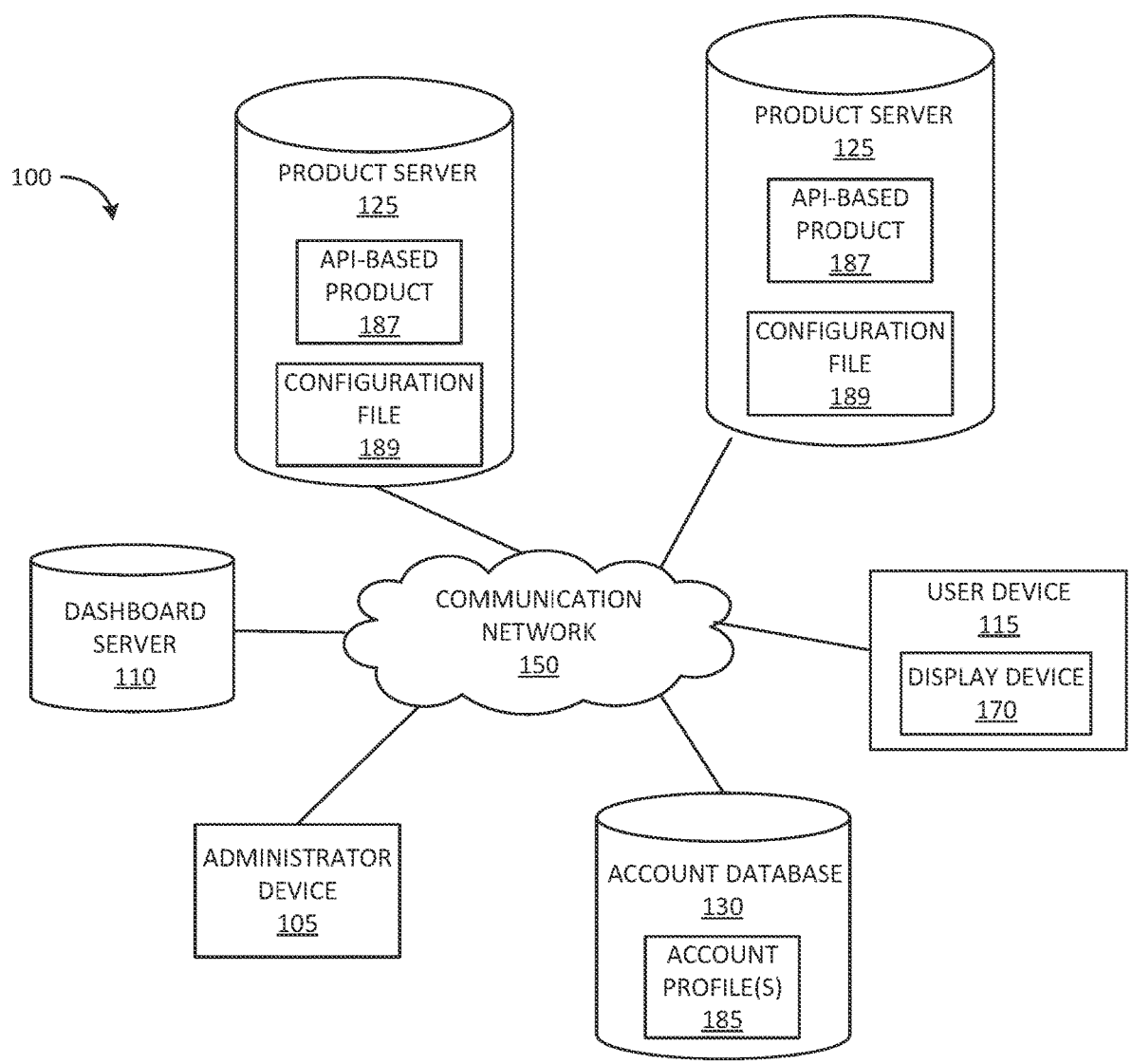
FIG. 1 is a block diagram of a system for providing visual dashboards for API-based products according to some embodiments.

FIG. 1 is a block diagram of a system 100 for providing visual dashboards for cloud-based products according to some embodiments. In the example shown, the system 100 includes an administrator device 105, a dashboard server 110, a user device 115, one or more product servers 125 (referred to herein collectively as "the product servers 125" and individually as "the product server 125"), and an account database 130. In some embodiments, the system 100 includes fewer, additional, or different components than illustrated in FIG. 1. For example, the system 100 may include multiple administrator devices 105, dashboard servers 110, user devices 115, account databases 130, or a combination thereof. As another example, two product servers 125 are illustrated in FIG. 1 as one example but the system 100 may include any number of product servers 125 in various embodiments. Also, in some embodiments, one or more of the components of the system 100 may be distributed among multiple servers, databases, or devices, combined within a single server, database, or device, or a combination thereof. As one example, in some embodiments, one or more of the product servers 125, the dashboard server 110, the administrator device 105, the account database 130, or a combination thereof may be combine within a single server, database, or device.

The administrator device 105, the dashboard server 110, the user device 115, the product servers 125, and the account database 130 communicate over one or more wired or wireless communication networks 150. Portions of the communication networks 150 may be implemented using a wide area network ("WAN"), such as the Internet, a local area network ("LAN"), such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly through the communication network 150.

Figure 2:
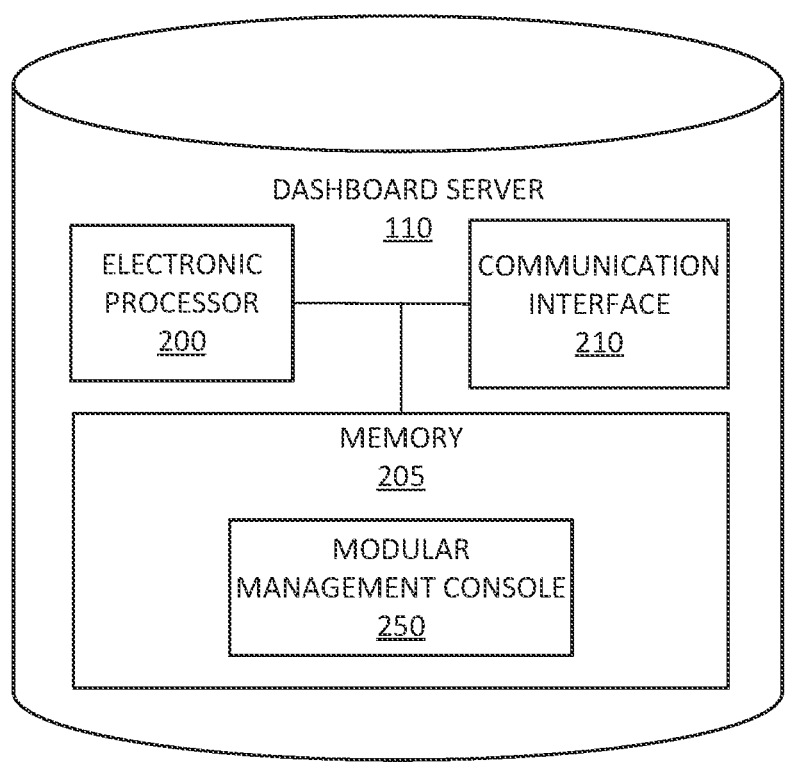
FIG. 2 is a block diagram of a server of the system of FIG. 1 according to some embodiments.

As illustrated in FIG. 2, the dashboard server 110 includes an electronic processor 200 (for example, a microprocessor, an application-specific integrated circuit ("ASIC"), or another suitable electronic device), a memory 205 (for example, a non-transitory, computer-readable medium), and a communication interface 210. The electronic processor 200, the memory 205, and the communication interface 210 communicate wirelessly, over one or more communication lines or buses, or a combination thereof. It should be understood that the dashboard server 110 may include additional, different, or fewer components than those illustrated in FIG. 2 in various configurations and may perform additional functionality than the functionality described herein. For example, in some embodiments, the functionality (or a portion thereof) described herein as being performed by the dashboard server 110 may be distributed among multiple servers or devices (including as part of a cloud-based service).

The communication interface 210 allows the dashboard server 110 to communicate with devices external to the dashboard server 110. For example, as illustrated in FIG. 1, the dashboard server 110 may communicate with the administrator device 105, the user device 115, one or more product servers 125, the account database 130, or a combination thereof through the communication interface 210. The communication interface 210 may include a port for receiving a wired connection to an external device (for example, a universal serial bus ("USB") cable and the like), a transceiver for establishing a wireless connection to an external device (for example, over one or more communication networks 150), or a combination thereof.

The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 stores a module management console 250. The modular management console 250 is a software application executable by the electronic processor 200. As described in more detail below, the modular management console 250, when executed by the electronic processor 200, generates and provides one or more visual dashboards for API-based products or solutions based on a configuration file (for example, the configuration file 189 of FIG. 1). Accordingly, in some embodiments, when the electronic processor 200 executes the modular management console 250, the electronic processor 200 provides a dynamic and engaging front-end application for API-based products. In some embodiments, the configuration file is a javascript object notation (JSON) formatted file including a configuration for an API of a product, service, or solution. Each product, service, or solution may provide a configuration file containing product-specific information required for its integration with the modular management console 250. For example, as described in greater detail below, the modular management console 250 (when executed by the electronic processor 200) accesses a configuration file (via, for example, an API call to an API-based product) and dynamically generates a full user interface and user experience for that API-based product based on an OpenAPI specification of that API product. In some embodiments, open standards or specifications are used to map API specifications to structured command line input.

Accordingly, in such embodiments, product mapping with the modular management console 250 is performed using the Open API specification path and routes defined in the configuration file. As one example, flags defined in the configuration file are used to determine which visual components for the corresponding API-based product will be generated. A flag defined in the configuration file may include, for example, a "canDelete" flag (which enables the delete screen for User Deletion), a "canCreate" flag (which enables the create screen for the User Creation), a "canUpdate" flag (which enables the update screen for the User Update), a "listRoute" flag (which enables the search screen for the User Search), and other suitable flags.

Flags may cause the system 100 for providing a visual dashboard to enable or disable different screens. In some cases, flags lead to different graphical user interface ("GUI") elements being hidden or shown in a visual dashboard. For example, a canCreate flag may result in a "Create" GUI element being added to a page. When the "Create" GUI element is clicked, a screen is revealed with a form for creating a new record in a list table to be displayed on the page. The createRoute API call may not be called until the user fills out this form and submits it. As another example, a canDelete flag may result in a "Delete" GUI element being added to every row in the aforementioned list table. When the "Delete" GUI element is clicked, a confirmation dialog is shown. The deleteRoute API call is not called until the user confirms. Each visual component is linked to (or calls) an API, which is formed using configuration information, such as "apiUrl" or "apiPath" and routes (listRoute, createRoute).

As another example, the below configuration maps a set of user APIs hosted for a product and enables the visual components to perform a "create user" action (with fields including "email" and "password") and a "list user" action.

```
"apiUrl": "https://api.aion-product.com",
"routes": [
    { "path": "/iam/user",     "component": "CrudListPage", "props": {
"config": { "$ref": "#/refs/iam/user" } } },
    { "path": "/iam/user/create",    "component": "CrudEditPage", "props": {
"config": { "$ref": "#/refs/iam/user" } } }
]
"refs": {
  "iam": {
    "user": {
      "title": "title-iam-user",
      "apiPath": "/iam/user",
      "primaryKeyFieldName": "directoryId",
      "fields": [
        { "name": "email", "fieldType": "text", "list": true, "readOnly": false },
        { "name": "password", "fieldType": "password", "list": false, "update":
false, "readOnly": false }
      ],
      "listRoute": "/iam/user",
      "createRoute": "/iam/user/create",
      "canDelete": true,
      "canCreate": true,
      "canUpdate": true
    }
  }
}
```

A series of branching instructions may be used to cause different portions of pre-designed content to be displayed or not displayed by the system 100 for providing a visual dashboard, in accordance with the configuration, based upon conditional tests of the data in the configuration file. This may be accomplished by the system 100 for providing a visual dashboard, for example, using conditional logic or a reactivity model in a scripting language. Content from the configuration file (e.g., a section title and a graphical icon identifier) is also interpolated into the final content. This may be using string concatenation, interpolation, or a reactivity model of the scripting language.

Accordingly, in some embodiments, execution of the modular management console 250 enables an API-based product to have a visual component or dashboard for users to interact with. In some embodiments, the modular management console 250 (via the visual dashboard) provides a standardized user experience with standardized functionality. Alternatively or in addition, the modular management console 250 (via the visual dashboard) provides a cloud agnostic experience by supporting multiple environments, platforms, or cloud-based services.

The administrator device 105 may include one or more desktop computers, laptop computers, tablet computers, terminals, smart telephones, smart televisions, smart wearables, servers, databases, other types of computing devices, or a combination thereof. Although not illustrated in FIG. 1, the administrator device 105 may include similar components as the server 110, such as an electronic processor, a memory, and a communication interface. The administrator device 105 may also include one or more input devices (for example, a keyboard, a keypad, a mouse, a joystick, a touchscreen, and the like) and one or more output devices (for example, a display device, a touchscreen, a printer, a speaker, and the like) that receive input from a user and provide output to a user.

The administrator device 105 may be used by an administrator (or another user) for providing (or generating) a configuration file for an API-based product. The administrator device 105 may transmit the configuration file to the product server 125 associated with the corresponding API-based product via the communication network 150. Alternatively or in addition, in some embodiments, the administrator device 105 is used by an administrator for providing (or generating) one or more updates for a configuration file. An update may include, for example, one or more lines of configuration to be added to a pre-existing configuration file. Alternatively or in addition, an update may include a new configuration file. As one example, an administrator may interact with the administrator device 105 to provide (or generate) one or more additional lines of configuration such that one or more additional API-based products or solutions (for example, a new API-based product) may be supported by (or added to) the modular management console 250.

The user device 115 may include one or more desktop computers, laptop computers, tablet computers, terminals, smart telephones, smart televisions, smart wearables, servers, databases, other types of computing devices, or a combination thereof. Although not illustrated in FIG. 1, the user device 115 may include similar components as the dashboard server 110, such as an electronic processor, a memory, and a communication interface. The user device 115 may also include one or more input devices (keyboard, keypad, mouse, joystick, touchscreen, and the like) and one or more output devices (display device, touchscreen, printer, speaker, and the like) that receive input from a user and provide output to a user. For example, as illustrated in FIG. 1, the user device 115 includes a display device 170.

A user (for example, an end user, a customer, a group of users, an organization, another user entity, or the like) may interact with the user device 115 to access a visual dashboard of API-based products displayed via the display device 170. The user may also interact with the visual dashboard using the user device 115. As one example, the user may interact with a visual dashboard to request a list of registered services for the user's account, a listing of API-based products available to the user's account for registration, a performance metric indicating a performance of at least one API-based product that the user's account is registered with, account information associated with the user's account, and the like. Alternatively or in addition, a user may interact with the user device 115 to register or create an account (or account profile) with the modular management console 250. Alternatively or in addition, a user may interact with the user device 115 to register the user's account with an available API-based product, perform an on-board process for the available API-based product, and the like.

As seen in FIG. 1, the account database 130 stores one or more account profiles 185. An account profile 185 is associated with an account of an entity or user. The account profile 185 includes account information related to the associated account. Account information may include, for example, a username, an account identifier, an organization identifier, a last name, a first name, a profile picture, one or more registered services or products, and the like. In some embodiments, the account information is user provided information. As one example, a user may provide account information via the user device 115 during a registration process or an account creation process. Accordingly, in some embodiments, the user device 115 transmits account information to the account database 130 for storage (as part of an account profile 185). In some embodiments, the account database 130 is combined with the server 110. Accordingly, in such embodiments, the dashboard server 110 receives the account information (as part of an account provide 185) and stores the account profiles 185 in the memory 205.

The product servers 125 may include one or more desktop computers, laptop computers, tablet computers, terminals, smart telephones, smart televisions, smart wearables, servers, databases, other types of computing devices, or a combination thereof. Although not illustrated in FIG. 1, the product servers 125 may include similar components as the dashboard server 110, such as an electronic processor, a memory, and a communication interface. The product servers 125 may also include one or more input devices (for example, a keyboard, a keypad, a mouse, a joystick, a touchscreen, and the like) and one or more output devices (for example, a display device, a touchscreen, a printer, a speaker, and the like) that receive input from a user and provide output to a user. In some embodiments, the functionality (or a portion thereof) described herein as being performed by a product server 125 may be distributed among multiple servers or devices (including as part of a cloud-based product or service). Also, in some embodiments, the functionality (or a portion thereof) described herein as being performed by a product server 125 may be performed by another component of the system 100, such as the dashboard server 110.

The product servers 125 store and provide an API-based product 187 and a configuration file 189 associated with the corresponding API-based product 187. It should be understood that in some embodiments, the configuration file 189 associated with a corresponding API-based product 187 may be stored remote to the product server 125, such as, for example, in the memory 205 of the dashboard server 110. The API-based product 187 is a software application executable by an electronic processor of the product server 125. An API-based product 187, when executed by an electronic processor, performs one or more security or anti-fraud functions, such as fraud detection, fraud monitoring, and the like. For example, an API-based product 187 may be an account takeover prevention application, a fraudulent account creation prevention application, and the like. In some embodiments, a single product server 125 supports multiple API-based products 187. However, in other embodiments, each product server 125 may provide a different API-based product 187. As one example, the system 100 may include a first product server 125 providing an account takeover prevention application (a first API-based product 187), a second product server 125 providing an online account origination application (a second API-based product 187), and the like. Accordingly, in some embodiments, the product servers 125 interact (or communicate) with one or more components of the system 100 as part of providing a visual dashboard for cloud-based products.

Figure 3:
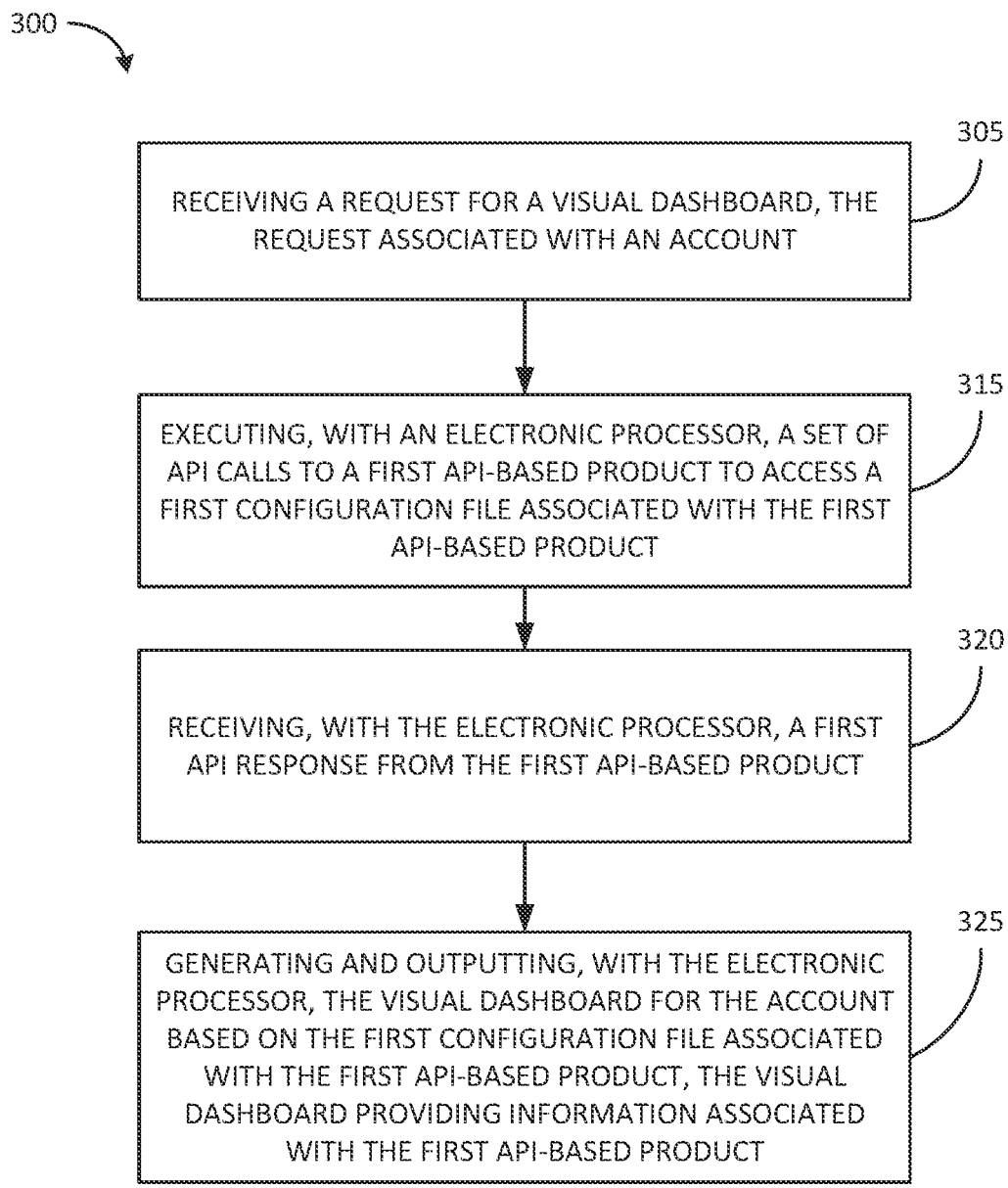
FIG. 3 is a flow chart of a method of providing visual dashboards for API-based products using the system of FIG. 1 according to some embodiments.

FIG. 3 is a flowchart illustrating a method 300 for providing a visual dashboard of API-based products according to some embodiments. The method 300 is described as being performed by the dashboard server 110 and, in some embodiments, the electronic processor 200 executing the modular management console 250. However, as noted above, the functionality performed by the dashboard server 110 (or a portion thereof) may be performed by other devices (via an electronic processor executing instructions), including, for example, the administrator device 105, the user device 115, a product server 125, or a combination thereof.

As seen in FIG. 3, the method 300 includes receiving, with the electronic processor 200, a request for a visual dashboard (at block 305). In some embodiments, the electronic processor 200 receives (through the communication interface 210) the request from the user device 115 via the communication network 150. The request may be associated with an account for a user of the user device 115 (for example, an account profile 185). Accordingly, in some embodiments, the electronic processor 200 analyzes the request to determine an account or account profile associated with the request.

In response to receiving the request for the visual dashboard (at block 305), the electronic processor 200 executes a set of API calls to a first API-based product (at block 315). Additionally, the electronic processor 200 receives an API response (for example, a first API response) from the API-based product 187 (at block 320). In some embodiments, the API-based product 187 is registered with the account associated with the request. An API call may be a request for data associated with a corresponding API-based product for the account (for example, a configuration of the API-based product 187). Accordingly, in some embodiments, the set of API calls to the first API-based product may include a request for a configuration of the first API-based product (for example, a configuration file 189 for the first API-based product). Accordingly, the API response received by the electronic processor 200 may include the configuration file 189 associated with the first API-based product. As one example, the configuration file 189 defines how visual components will be available for the first API-based product, defines which API call will be made on submission of a visual component, and the like. Alternatively or in addition, the set of API calls may include one or more requests for additional information associated with the first API-based product. For example, an API call may include a get-account-information call, a get-registered services call, a get-account-status call, get-marketplace-services, or the like. An API response may include data associated with the corresponding API-based product for the account (for example, the API-based product 187). As one example, the electronic processor 200 may execute an API call, such as a get-account-information call, to a product server 125 (for example, an API-based product 187) for account information relating to the API-based product 187 for the account (or account profile 185) associated with the request. In response to receiving the get-account-information call, the product server 125 (for example, the API-based product 187) may generate and transmit, to the electronic processor 200, an API response including the account information requested by the corresponding API call.

In some embodiments, the electronic processor 200 performs multiple API calls (for example, a second API call, a third API call, and the like). In some embodiments, each API call is to a different API-based product. However, in other embodiments, one or more of the multiple API calls are made to the same API-based product. Similarly, the electronic processor 200 may receive multiple API responses.

Accordingly, in some embodiments, the product servers 125 interact (or communicate) with one or more components of the system 100 as part of providing a visual dashboard for cloud-based products. As one example, the server 110 may make one or more API calls to the product server 125. The API calls may be received by the product server 125 via an API of the product server 125. In some embodiments, an API call to the product server 125 may include a request for information related to the product or solution provided by the product server 125 (for example, a configuration of the API-based product 187). As one example, for a given user account, the API call may be "GET-account-status," where the response provided by the product server 125 is an account status for the given user account.

After receiving the one or more API responses (at block 320), the electronic processor 200 generates and outputs a visual dashboard for the account based on the one or more API responses (at block 325). The visual dashboard provides information associated with an API-based product 187. In some embodiments, the modular management console 250 generates a visual dashboard that is themed and localized for target audiences (for example, based on an account profile or account information). The visual dashboard may include, for example, a listing of registered API-based products that the account is registered with, a listing of available API-based products that are available to the account for registration, a performance metric indicating a performance of the first API-based product (for example, a number of fraudulent account creation attempts prevented by the corresponding API-based product), account information associated with the account, and the like. Account information may include, for example, an account identifier (for example, a username or account number), a name of an account holder or user, a profile picture of the account holder or user, an organization identifier, and the like.

In some embodiments, the electronic processor 200 receives an update to the configuration file 189. As one example, the electronic processor 200 may receive the update from the administrator device 105 through the communication network 150. As noted above, the update may include one or more additional lines of configuration. As one example, the update may include a new URL associated with a new API-based product. In response to receiving the update, the electronic processor 200 updates the configuration file 189 based on the received update. In some embodiments, the electronic processor 200 updates the configuration file 189 by adding the one or more additional lines of configuration to the configuration file 189. However, in other embodiments, the electronic processor 200 replaces the configuration file 189 with a new configuration file 189 including the one or more additional lines of configuration.

In some embodiments, the electronic processor 200 detects a user interaction with the visual dashboard (or a graphical user interface thereof, as described below). A user interaction may include a user selection of an option, information, or the like provided by the visual dashboard. In response to detecting the user interaction, the electronic processor 200 generates and provides an updated visual dashboard. In other words, the electronic processor 200 updates the visual dashboard. As one example, when the user interaction is a request for a listing of available API-based products that are available to the user for registration, the electronic processor 200 generates and provides an updated visual dashboard including the listing of available API-based products. For example, FIGS. 4-13 illustrate example graphical user interfaces generated and provided as part of the visual dashboard. As described in greater detail below, the electronic processor 200 generates and provides the graphical user interfaces of FIGS. 4-13 in response to detecting one or more user interactions.

Figure 4:
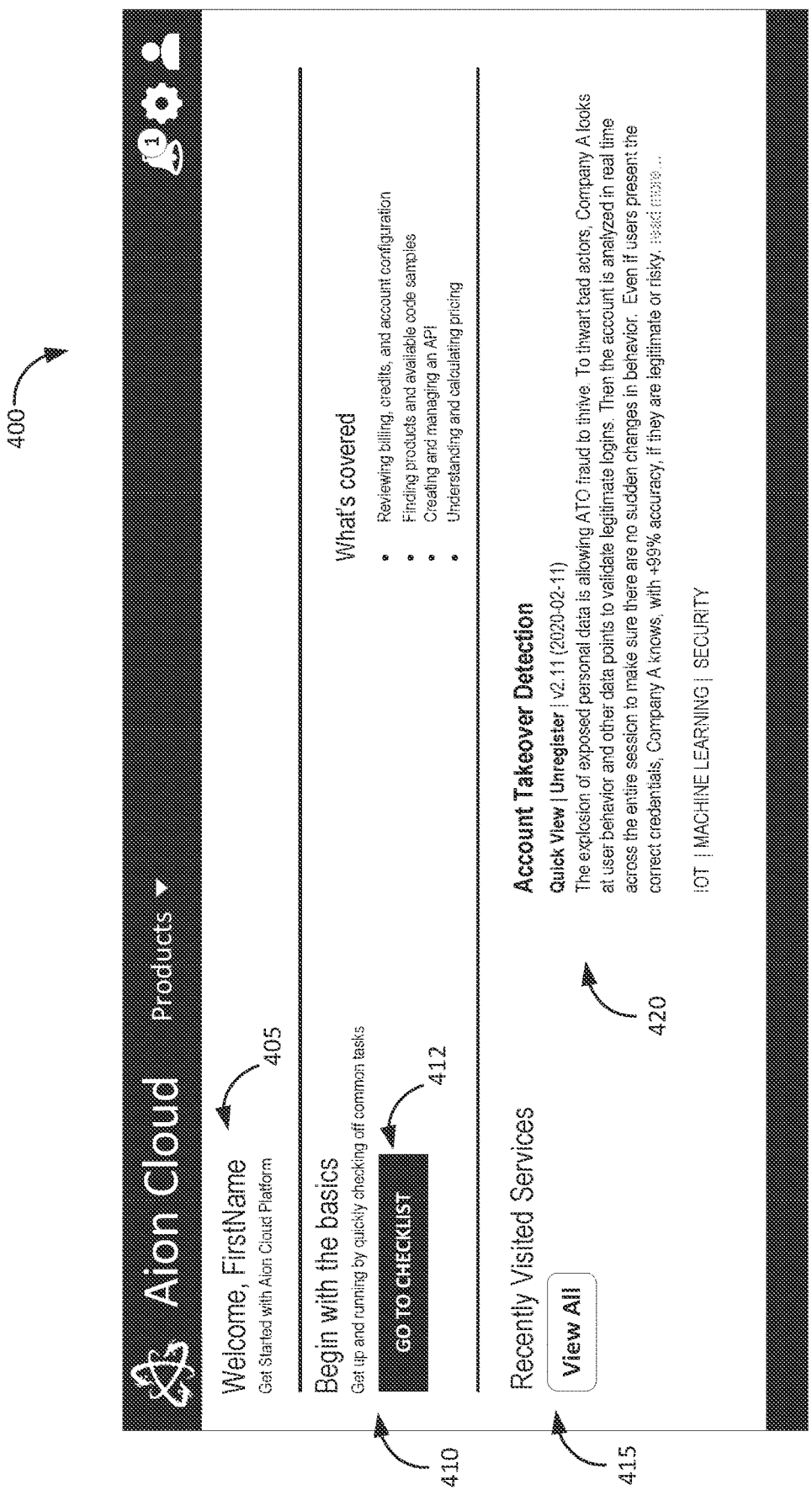
FIGS. 4-13 illustrate example graphical user interfaces according to some embodiments.

As a first example, FIG. 4 illustrates a first example graphical user interface 400 according to some embodiments. In response to the electronic processor 200 detecting a successful log-in attempt for the account profile 185 of the user (where the user previously registered or created the account profile 185), the electronic processor 200 generates and provides the graphical user interface 400 of FIG. 4. Accordingly, the graphical user interface 400 may function as a greeting or home user interface for the visual dashboard. In some embodiments, the electronic processor 200 executes one or more API calls to generate and provide the graphical user interface 400. As one example, the electronic processor 200 may execute a "get-account-information ( )" API call for providing content including, for example, a username, an account identification, an organization identification, a first name, a last name, a profile picture, other known data associated with the account or account holder, or a combination thereof. As another example, the electronic processor 200 may execute a "get-registered-services ( )" API call to provide a listing of registered API-based products that the account is registered with (for example, at an organizational level, a user level, or the like).

Accordingly, as seen in FIG. 4, the graphical user interface 400 may include account information 405, such as a "First Name" of the account holder or user. Additionally, in the illustrated example, the graphical user interface 400 may include additional information, such as a getting started section 410 and a recently visited services section 415. As seen in FIG. 4, the getting started section 410 includes a checklist button 412. When selected by a user, the checklist button 412 may launch a checklist for getting started with the graphical user interface 400. As seen in FIG. 4, the recently visited services section 415 provides a preview 420 of a recently visited product or service. In the illustrated example, the preview 420 includes title of the recently visited product or service (in this example, Account Takeover Detection), a description of the recently visited product or service, and additional information relating to the recently visited product or service (for example, whether the recently visited product or service is a registered or unregistered product or service, a version of the product or service, a date of the previous view, or the like.

Figure 5:
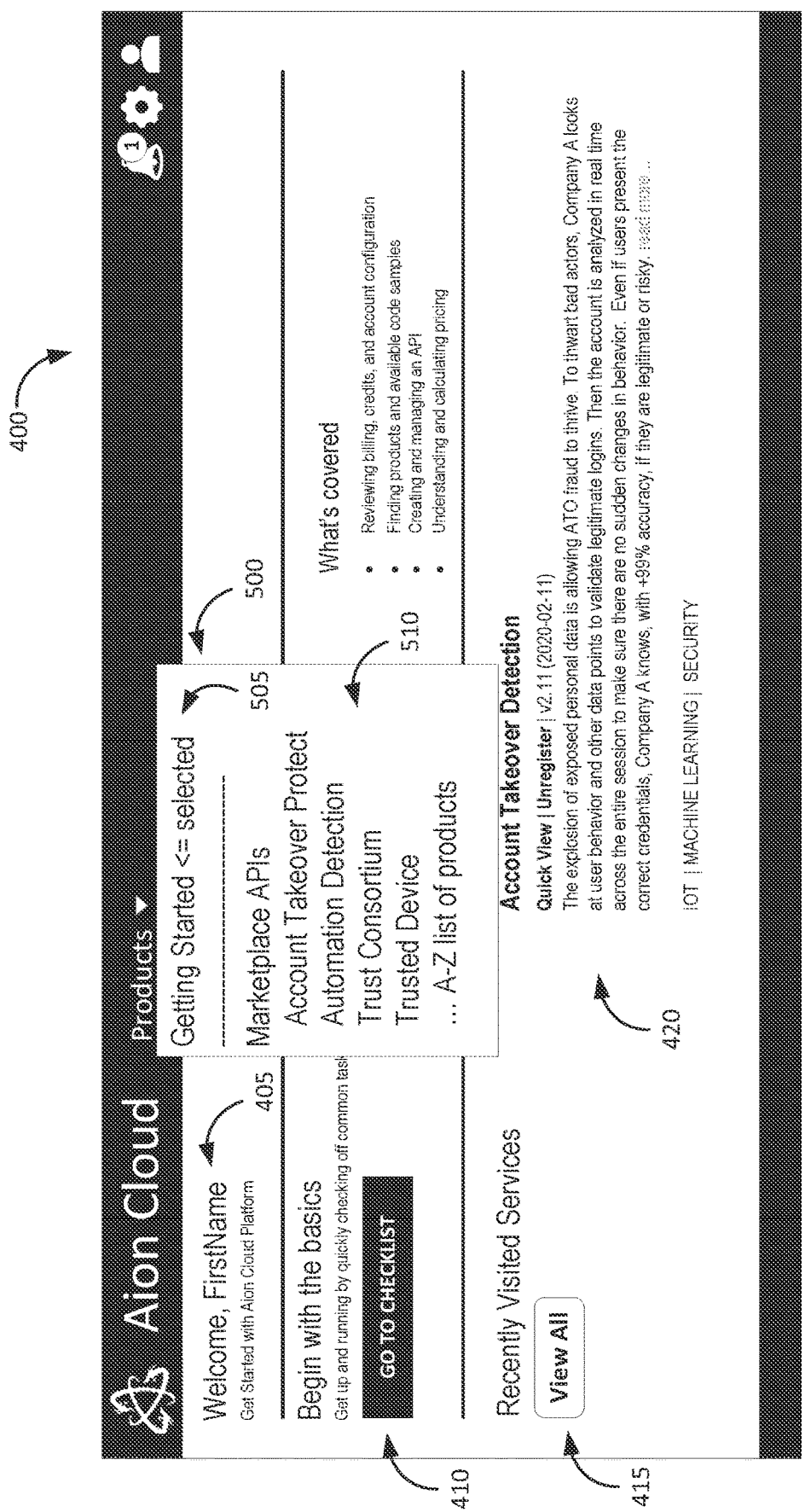

As illustrated in FIG. 5, a user may interact with or select a drop-down menu 500. In the illustrated example, when a user interacts with the drop-down menu 500, the electronic processor 200 generates and provides a list of options. As seen in FIG. 5, the list of options may include, for example, a getting started option 505 and a listing of API-based products 510. In response to a user selecting an API-based product from the listing of API-based products 510, the electronic processor 200 may generate and provide a graphical user interface related to the selected API-based product. As one example, the graphical user interface may include information associated with the selected API-based product, such as whether the account is registered with the selected API-based product, a description of the functionality provided by the selected API-based product, and the like. As one example, the electronic processor 200 may execute a "list-marketplace-services( )" API call, a "get-marketplace-service( )" API call, a "registered-marketplace-service( )"

API call, or the like for providing the list of options, providing a graphical user interface related to a selected API-based product, or the like.

Figure 6:
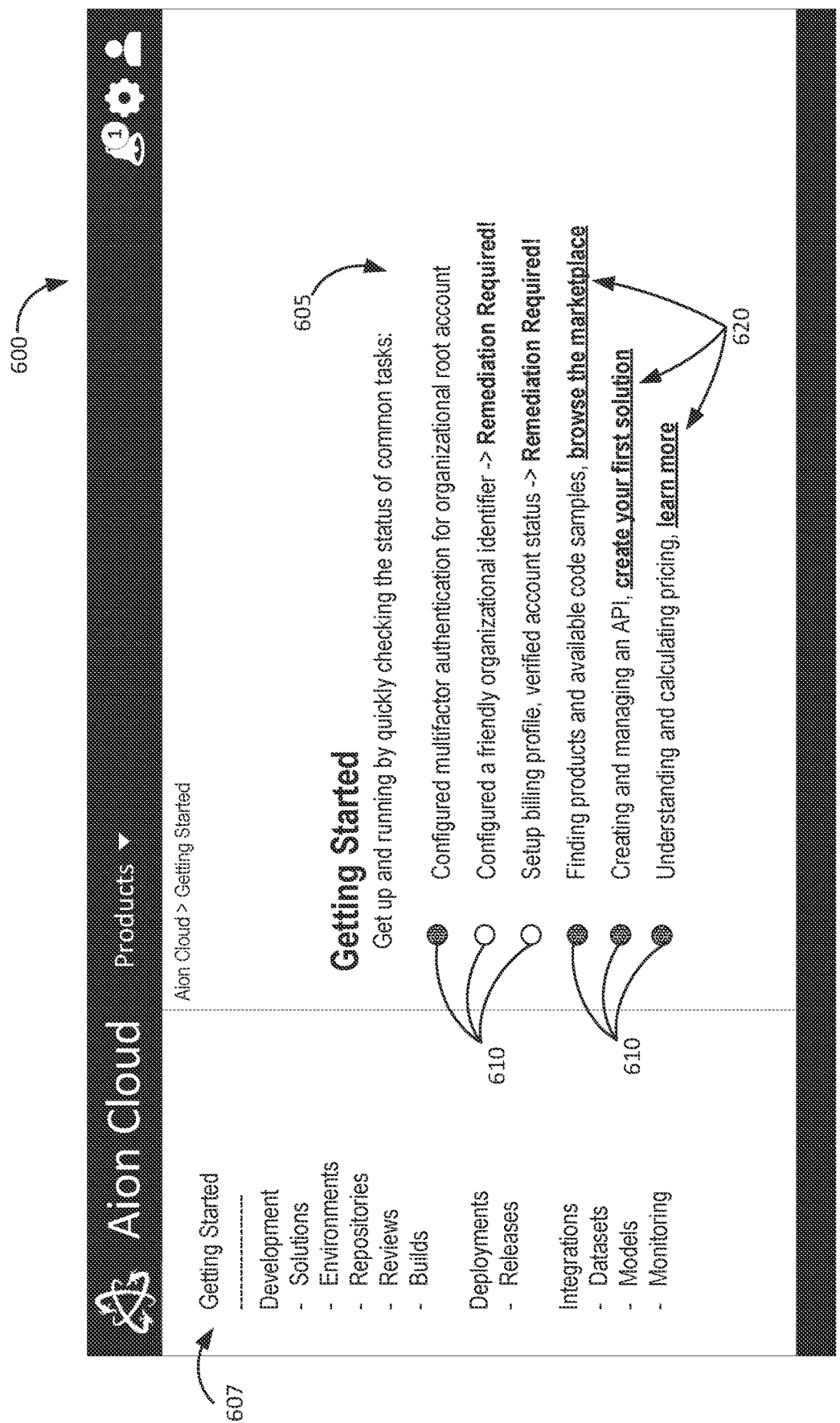

FIG. 6 illustrates an example graphical user interface 600 generated in response to a user selecting the getting started option 505 of FIG. 5. As seen in FIG. 6, the graphical user interface 600 include a list of tasks 605 and a navigation section 607. The list of tasks 605 may include, for example, one or more common tasks performed as initial or start-up steps of utilizing the visual dashboard. In some embodiments, a task status (such as successful or failed) is also included in the graphical user interface 600. In the illustrated example, the task status is indicated by a status indicator 610. In some embodiments, the status indicator 610 is a graphical indicator. As one example, the status indicator 610 may be a first color, such as green, when the task has a successful task status (represented in FIG. 6 as a filled status indicator 610). As another example, the status indicator 610 may be a second color, such as red, when the task has a failed task status (represented in FIG. 6 as an unfilled status indicator 610). Alternatively or in addition, the status indicator 610 may be a text indicator. As one example, the text indicator may read "Remediation Required!" as illustrated in FIG. 6.

In some embodiments, one or more of the tasks included in the list of tasks 605 includes a selectable link 620 configured to redirect the user to another graphical user interface (not shown). For example, as illustrated in FIG. 6, the selectable link 620 may include a "browse the marketplace" link, a "create your first solution" link, a "learn more link," and the like. As one example, in response to detecting a selection of a selectable link 620, the electronic processor 200 may generate and provide a graphical user interface associated with the selected link. As one example, in response to detecting a selection of the "browse marketplace" link, the electronic processor 200 may generate and provide a graphical user interface including a listing of available API-based products, information associated with each API-based product listed, and the like.

Figure 7:
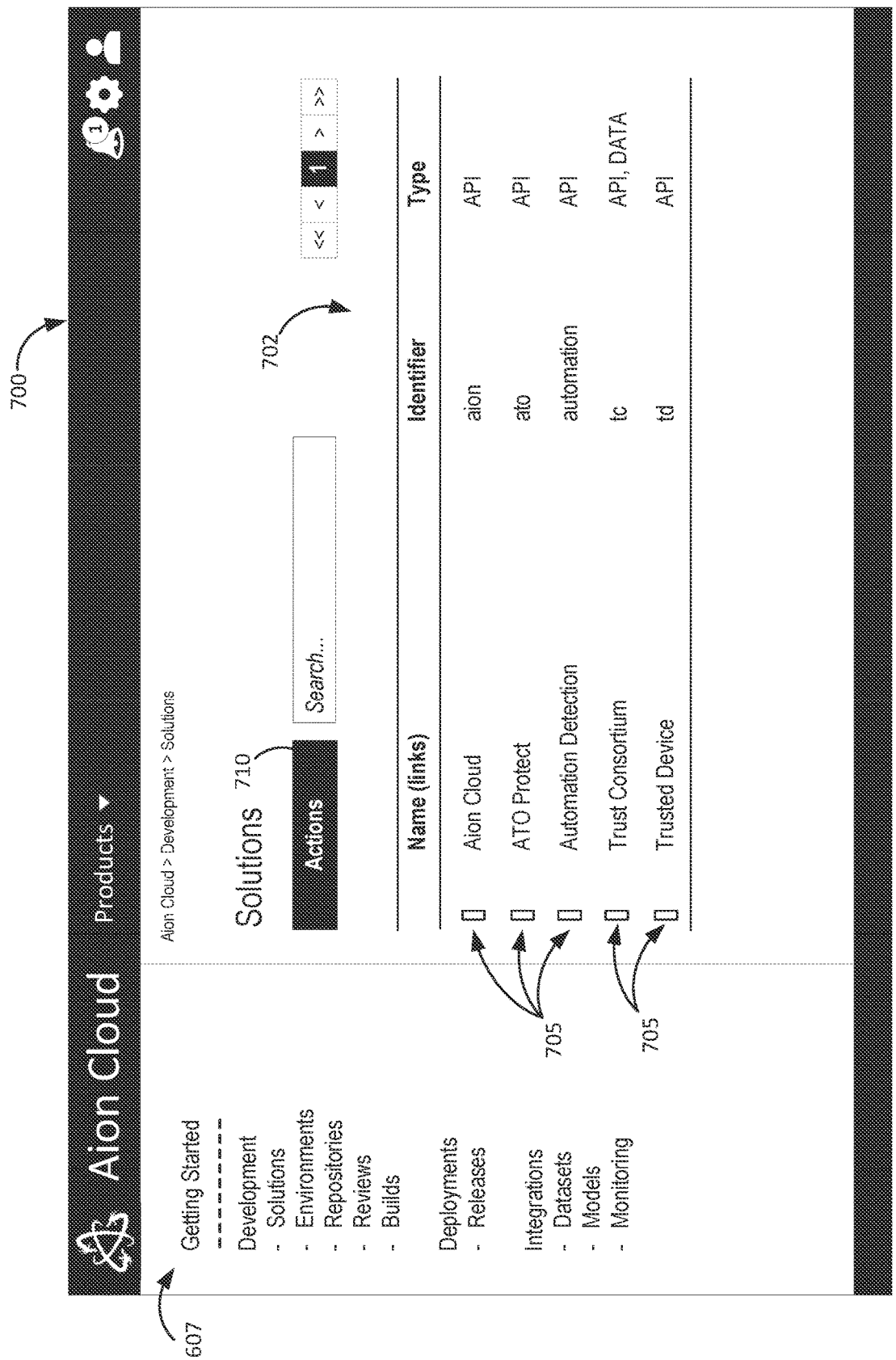
Figure 8:
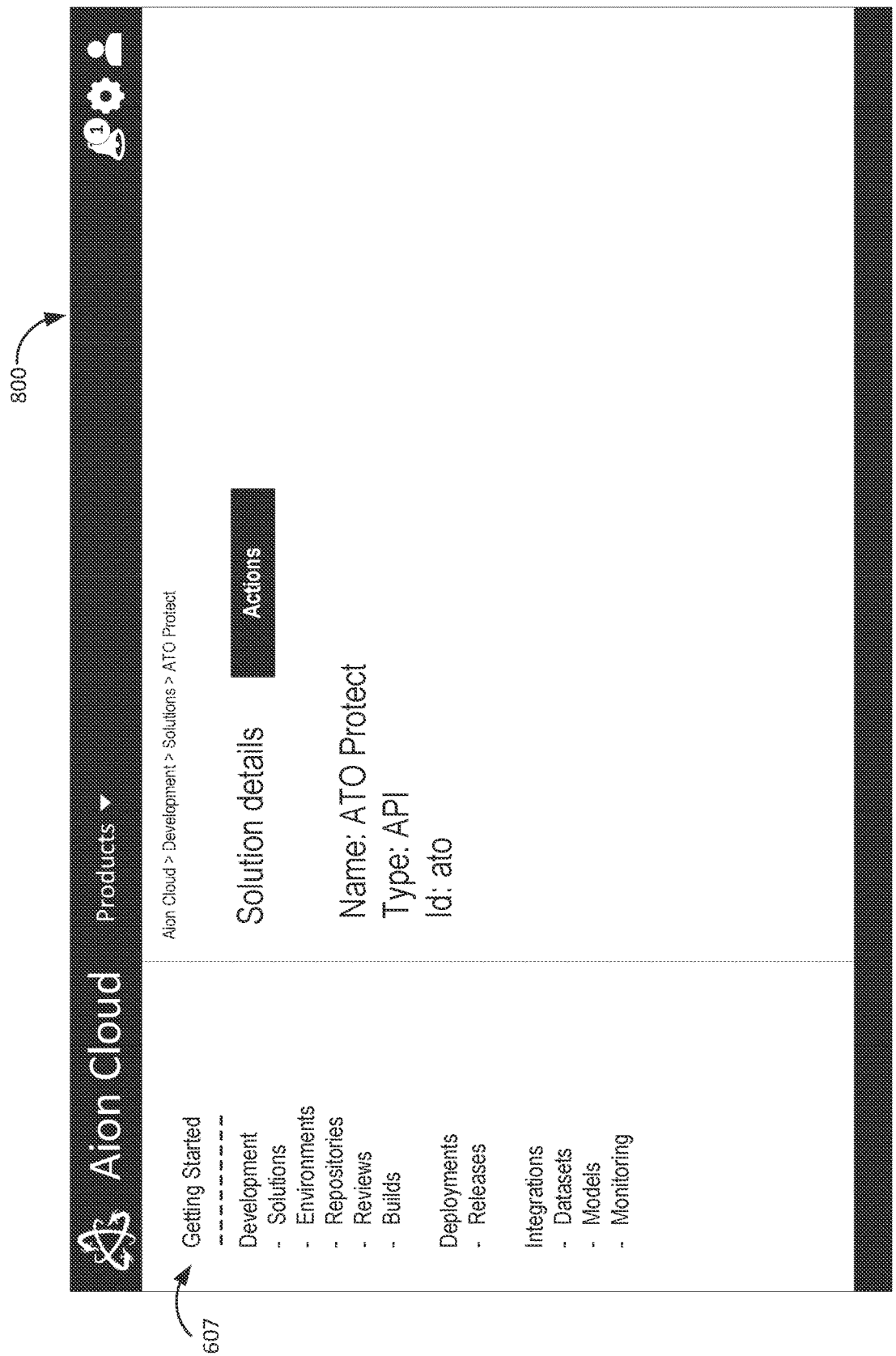

A user may interact with the navigation section 607 to navigate to one or more additional graphical user interfaces. As one example, FIG. 7 illustrates a graphical user interface 700 generated and provided by the electronic processor 200 in response to a user selecting a "solutions" option included in the navigation section 607. As seen in FIG. 7, the graphical user interface 700 includes a listing of registered API-based products 702 and additional information associated with each registered API-based product (such as an identifier and a type). The listing of registered API-based products 702 includes one or more current API-based products associated with (or registered with) the account profile 185. In some embodiments, the electronic processor 200 detects one or more user interactions with the listing of registered API-based products 702. As one example, the electronic processor 200 may detect a user interaction selecting an API-based product included in the listing of registered API-based products 702. A user may select an API-based product to see additional details with respect to the selected API-based product, such as a performance metric, a version, and the like. For example, FIG. 8 illustrates an example graphical user interface 800 including additional details with respect to a selected API-based product (in the illustrated example, an "ATO Protect" product).

As another example, the electronic processor 200 may detect a user interaction selecting a check box 705 associated with an API-based product and a user interaction selecting an action (via, for example, an action drop-down menu 710) for the API-based product associated with the selected check box 705. In response to the user selecting the check box 705 and selecting the action, the electronic processor 200 may perform the selected action for the API-based product associated with the selected check box 705. The selected action may include, for example, an update solution action, a delete solution action, and the like.

Figure 9:
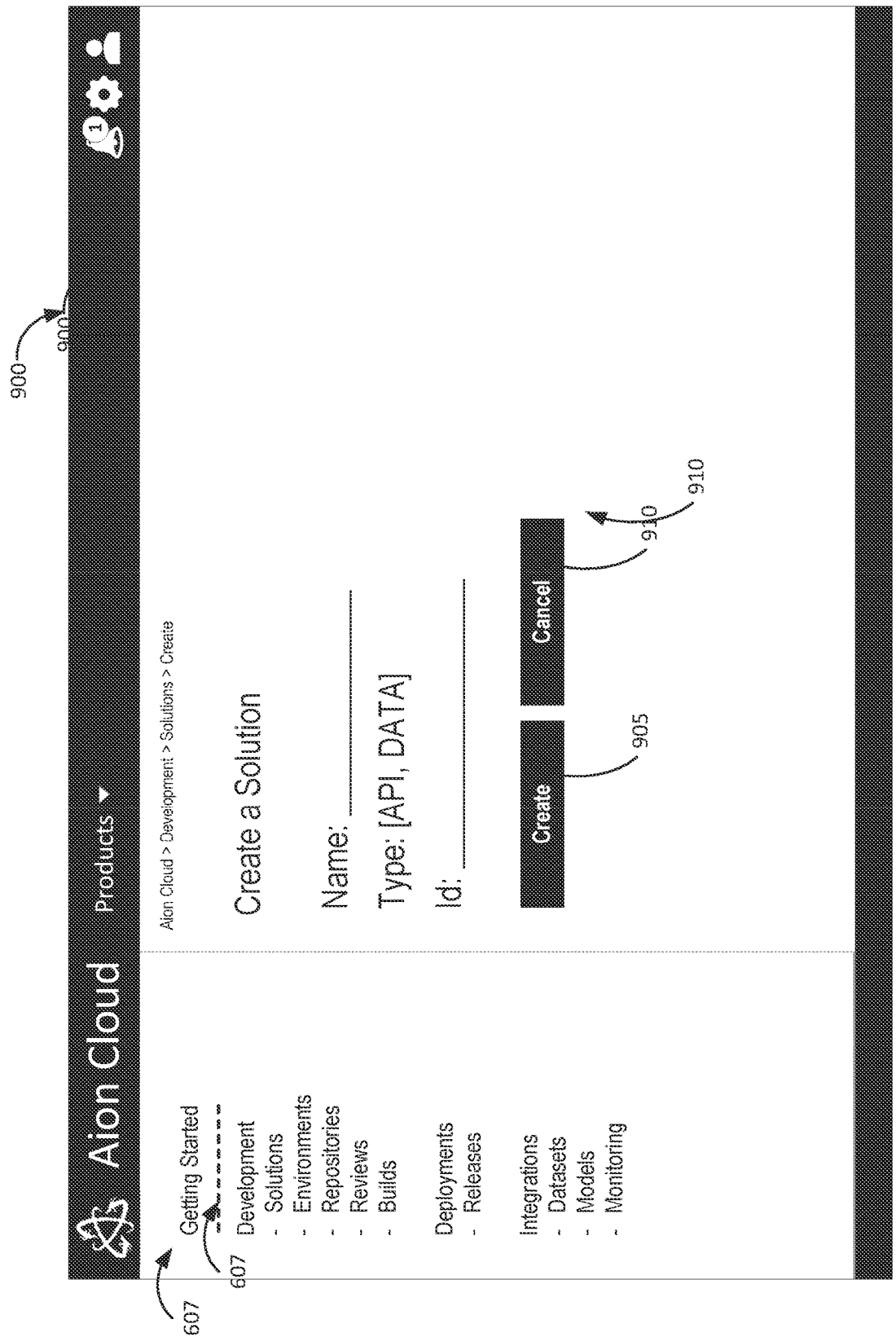

Alternatively or in addition, in some embodiments, the electronic processor 200 may detect a user interaction selecting a create solution action from the action drop-down menu 710. In response to the user selecting the create solution action, the electronic processor 200 may generate and provide a graphical user interface 900 for creating a new solution (or API-based product) as illustrated in FIG. 9. As seen in FIG. 9, a user may provide information, such as a name, a type, an identification, and the like, for the new API-based product. As also seen in FIG. 9, the graphical user interface 900 may also include a create button 905 and a cancel button 910. In response to detecting a selection of the create button 905, the electronic processor 200 may create (or add) the new API-based product based on the information provided by the user. In response to detecting a selection of the cancel button 910, the electronic processor 200 may cancel the creation process.

Figure 10:

As noted above, a user may interact with the navigation section 607 to navigate to one or more additional graphical user interfaces. As another example, FIG. 10 illustrates a graphical user interface 1000 generated and provided by the electronic processor 200 in response to a user selecting an "environments" option included in the navigation section 607. As seen in FIG. 10, the graphical user interface 1000 includes a listing of environments 1002 and additional information associated with each environment (such as a stage, an identifier, a type, and the like).

Figure 11:
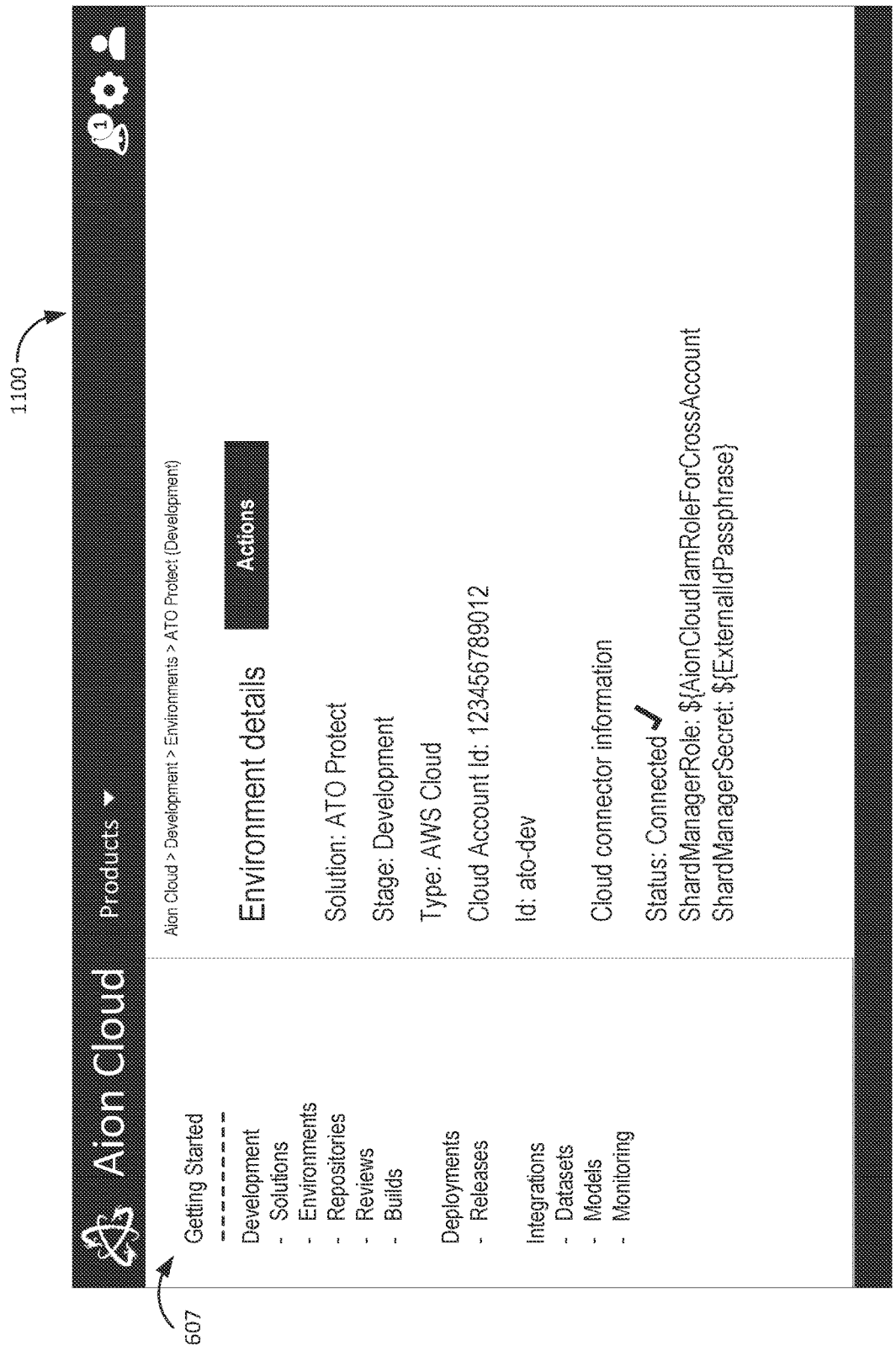

The listing of environments 1002 includes one or more environments associated with (or registered with) the account profile 185. In some embodiments, the electronic processor 200 detects one or more user interactions with the listing of environments 1002. As one example, the electronic processor 200 may detect a user interaction selecting an environment included in the listing of environments 1002. A user may select an environment to see additional details with respect to the selected environment. As one example, FIG. 11 illustrates an example graphical user interface 1100 including additional information with respect to a selected environment. In the illustrated example, the additional information may include, for example, a solution or API-based product associated with the selected environment, additional information associated with the selected environment (for example, a stage, a type, an account identification, an environment identification), connector information, such as a connection status and the like), and the like.

Figure 12:
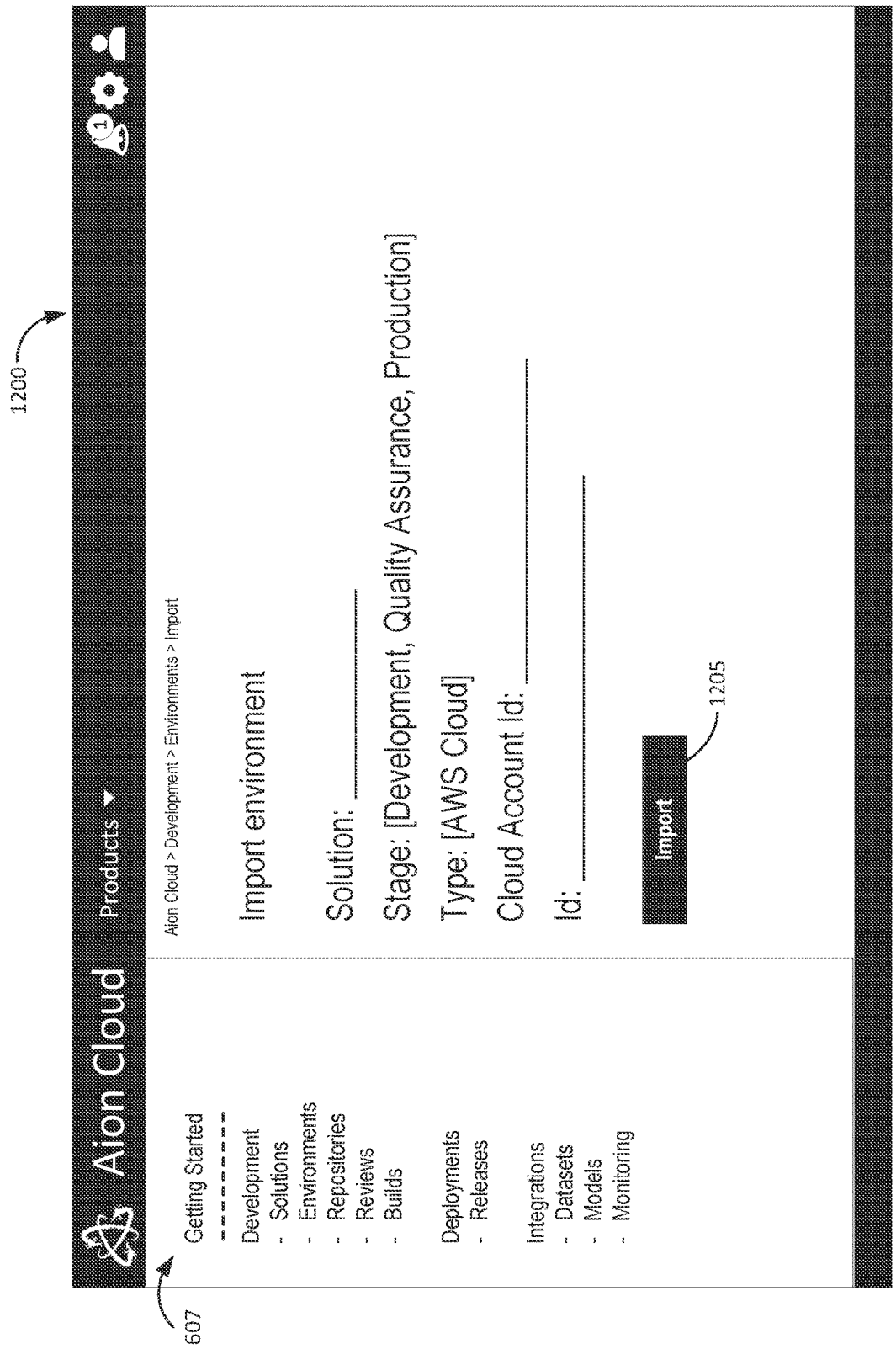
Figure 13:
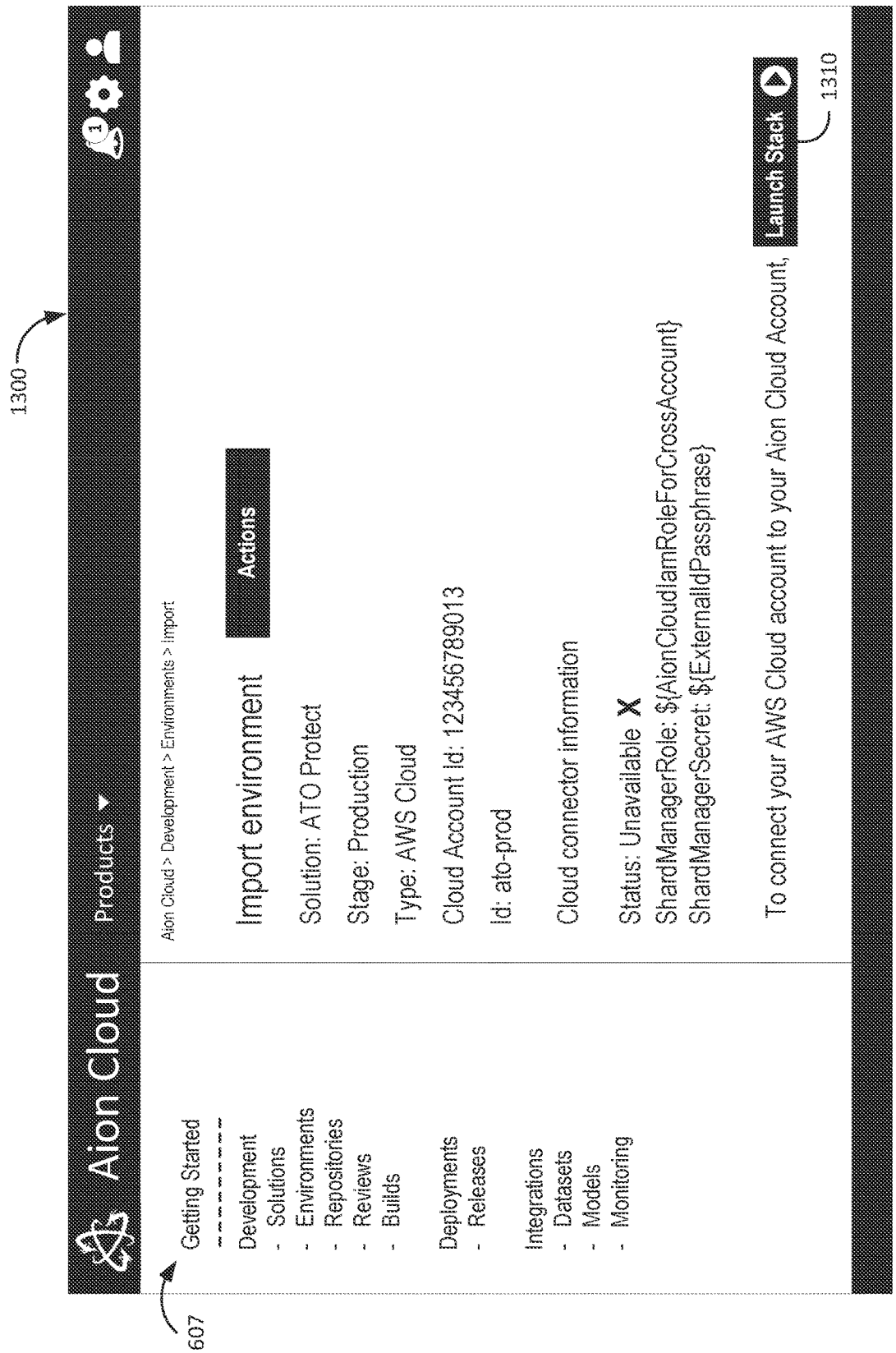

FIG. 12 illustrates an example graphical user interface 1200 for importing an environment according to some embodiments. As seen in FIG. 12, the graphical user interface 1200 may be used by a user to provide information relating to importing the environment, such as a solution, a stage, a type, an account identifier, and the like. In response to the user selecting an import button 1205, the electronic processor 200 may generate and provide the example graphical user interface 1300 of FIG. 13. The graphical user interface 1300 may function or serve as a confirmation or verification. After a user reviews the information associated with the import, a user may interact with a launch button 1310 to complete the import process (or to launch the imported environment).

Thus, the embodiments described herein provide, among other things, methods and systems for providing visual dashboards for API-based products. Various features and advantages of the embodiments are set forth in the following claims.

It is to be understood that the embodiments are not limited in its application to the details of construction and the arrangement of components set forth in the following description or illustrated in the accompanying drawings. The embodiments are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

What is claimed is:

1. A system for providing visual dashboards for API-based products, the system comprising:
    an electronic processor configured to:
        receive a request for a visual dashboard;
        execute a first application programming interface (API) call to a first API-based product, the first API call including an API request by the electronic processor to access a first configuration file associated with the first API-based product;
        receive a first API response from the first API-based product;
        generate and output, based on the first configuration file associated with the first API-based product, the visual dashboard, the visual dashboard providing information associated with the first API-based product;
        detect a user interaction with the visual dashboard; and
        in response to detecting the user interaction, update the visual dashboard.

2. The system of claim 1, wherein the first API-based product is registered with an account associated with the request for the visual dashboard.

3. The system of claim 1, wherein the API request is a request for data associated with the first API-based product for an account associated with the request for the visual dashboard and the first API response includes the data associated with the first API-based product for the account associated with the request for the visual dashboard.

4. The system of claim 1, wherein the first configuration file defines how visual components of the visual dashboard will be available for the first API-based product.

5. The system of claim 1, wherein the electronic processor is further configured to:
    execute a second API call to a second API-based product to access a second configuration file associated with the second API-based product; and
    receive a second API response from the second API-based product;
    wherein the visual dashboard also provides information associated with the second API-based product.

6. The system of claim 1, wherein the electronic processor is further configured to:
    receive an update to the first configuration file; and
    update the first configuration file based on the update.

7. The system of claim 6, wherein the update includes at least one new configuration associated with the first API-based product.

8. The system of claim 1, wherein the visual dashboard includes a listing of registered API-based products that an account associated with the request for the visual dashboard is registered with.

9. The system of claim 1, wherein the visual dashboard includes a listing of available API-based products that are available for registration to an account associated with the request for the visual dashboard.

10. The system of claim 1, wherein the visual dashboard includes account information, the account information including at least one selected from a group consisting of an account identifier, a name of an account holder, a profile picture of the account holder, and an organization identifier.

11. The system of claim 1, wherein the visual dashboard includes a performance metric indicating a performance of the first API-based product.

12. A method for providing visual dashboards for API-based products, the method comprising:
    receiving a request for a visual dashboard;
    executing, with an electronic processor, a set of application programming interface (API) calls to a first API-based product, the set of API calls including an API request for an electronic processor to access a first configuration file associated with the first API-based product;

receiving, with the electronic processor, a first API response from the first API-based product;

generating and outputting, with the electronic processor, the visual dashboard based on the first configuration file associated with the first API-based product, the visual dashboard providing information associated with the first API-based product;

detecting a user interaction with the visual dashboard; and in response to detecting the user interaction, updating the visual dashboard.

13. The method of claim 12, further comprising:

executing a second API call to a second API-based product to access a second configuration file associated with the second API-based product; and receiving a second API response from the second API-based product, wherein the visual dashboard also provides information associated with the second API-based product.

14. The method of claim 12, further comprising:

receiving an update to the first configuration file; and updating the first configuration file based on the update.

15. The method of claim 14, wherein updating the first configuration file includes adding to the configuration file at least one new configuration associated with the first API-based product.

16. The method of claim 12, wherein generating and outputting the visual dashboard includes generating and outputting the visual dashboard including at least one selected from a group consisting of a listing of registered API-based products that an account associated with a request for the visual dashboard is registered with, a listing of available API-based products that are available for registration to the account associated with the request for the visual dashboard, a performance metric indicating a performance of the first API-based product, and account information associated with the account associated with the request for the visual dashboard.

17. A non-transitory, computer-readable medium storing instructions that, when executed by an electronic processor, causes the electronic processor to perform a set of functions, the set of functions comprising:

receiving a request for a visual dashboard;

executing a set of application programming interface (API) calls to a first API-based product, the set of API calls including an API request for an electronic processor to access a first configuration file associated with the first API-based product;

receiving a first API response from the first API-based product;

generating and outputting the visual dashboard based on the first configuration file associated with the first API-based product, the visual dashboard providing at least a performance metric associated with the first API-based product;

detecting a user interaction with the visual dashboard; and generating and outputting an updated visual dashboard based on the user interaction.

18. The computer-readable medium of claim 17, wherein detecting the user interaction includes detecting a request for at least one selected from a group consisting of a listing of registered API-based products that an account associated with the request for the visual dashboard is registered with, a listing of available API-based products that are available to the account for registration, and account information associated with the account.

19. A system for providing visual dashboards for API-based products, the system comprising:

an electronic processor configured to:

receive a request for a visual dashboard;

execute a first application programming interface (API) call to a first API-based product, the first API call including an API request by the electronic processor to access a first configuration file associated with the first API-based product;

receive a first API response from the first API-based product; and generate and output, based on the first configuration file associated with the first API-based product, the visual dashboard, the visual dashboard providing information associated with the first API-based product;

wherein the electronic processor is further configured to:

receive an update to the first configuration file; and update the first configuration file based on the update.

* * * * *